(12) United States Patent
McDaniel

(10) Patent No.: US 12,535,821 B2
(45) Date of Patent: Jan. 27, 2026

(54) DYNAMICALLY REFINING MARKERS IN AN AUTONOMOUS WORLD MODEL

(71) Applicant: Siemens Aktiengesellschaft, Munich (DE)

(72) Inventor: Richard Gary McDaniel, Hightstown, NJ (US)

(73) Assignee: Siemens Aktiengesellschaft, Munich (DE)

( * ) Notice: Subject to any disclaimer, the term of this patent is extended or adjusted under 35 U.S.C. 154(b) by 600 days.

(21) Appl. No.: 17/284,081

(22) PCT Filed: Oct. 29, 2018

(86) PCT No.: PCT/US2018/057982
§ 371 (c)(1),
(2) Date: Apr. 9, 2021

(87) PCT Pub. No.: WO2020/091725
PCT Pub. Date: May 7, 2020

(65) Prior Publication Data
US 2021/0349470 A1 Nov. 11, 2021

(51) Int. Cl.
*G05D 1/00* (2024.01)
*B60W 60/00* (2020.01)
*G05B 13/02* (2006.01)

(52) U.S. Cl.
CPC ....... *G05D 1/0274* (2013.01); *B60W 60/0025* (2020.02); *G05B 13/0265* (2013.01); *G05D 1/0276* (2013.01); *B60W 2556/45* (2020.02)

(58) Field of Classification Search
CPC ............... G05D 1/0274; G05D 1/0276; G05D 2201/0216; B60W 60/0025; B60W 2556/45; G05B 13/0265
See application file for complete search history.

(56) References Cited

U.S. PATENT DOCUMENTS 8,386,078 B1  2/2013 Hickman et al.
9,167,386 B2  10/2015 Valaee et al.
(Continued)

FOREIGN PATENT DOCUMENTS

CN 103433923 A 12/2013
CN 105143909 A 12/2015
(Continued)

OTHER PUBLICATIONS

PCT International Search Report corresponding to PCT International Application No. PCT/US2018/057982; 4 pages.
(Continued)

*Primary Examiner* — Kito R Robinson
*Assistant Examiner* — Roy Rhee

(57) ABSTRACT

A system for performing autonomous operations in an operating environment comprising a plurality of objects includes a server computer. The server computer comprises a nontransitory computer readable medium storing detailed representations of the objects in the operating environment. Each detailed representation of an object comprises one or more markers providing knowledge information related to the object. The autonomous device comprises a non-transitory computer readable medium storing a world model that comprises sparse representations of the objects in the operating environment, a processor configured to use the world model to execute tasks requiring use of at least one of the objects, and a networking card for connecting to the server computer. When execution of a new task requires use of a particular object in the operating environment, the autonomous device updates the world model to include the detailed representation of the particular object.

19 Claims, 6 Drawing Sheets

(56) References Cited

U.S. PATENT DOCUMENTS

| | | | |
|---|---|---|---|
| 9,342,781 B2 | 5/2016 | Cornebise et al. | |
| 9,671,786 B2 | 6/2017 | Baltes et al. | |
| 10,642,274 B2 | 5/2020 | Storfer et al. | |
| 2006/0112034 A1 | 5/2006 | Okamoto et al. | |
| 2016/0103729 A1* | 4/2016 | Palframan | G06F 11/1666 |
| | | | 714/15 |
| 2018/0302424 A1* | 10/2018 | Bender | H04L 63/1425 |
| 2020/0070343 A1* | 3/2020 | Thomaz | B25J 9/163 |

FOREIGN PATENT DOCUMENTS

| | | | |
|---|---|---|---|
| CN | 105144203 A | 12/2015 | |
| CN | 108290290 A | 7/2018 | |
| WO | 2015134391 A1 | 9/2015 | |

OTHER PUBLICATIONS

Andreas Domel et al. "Toward Fully Autonomous Mobile Manipulation for Industrial Environments" International Journal of Advanced Robotic Systems; vol. 14; No. 4; Jul. 1, 2017.

* cited by examiner

DYNAMICALLY REFINING MARKERS IN AN AUTONOMOUS WORLD MODEL

This application is a national phase filing under 35 U.S.C. § 371 of International Patent Application No. PCT/US2018/057982, filed Oct. 29, 2018, which is incorporated herein by reference in its entirety.

TECHNICAL FIELD

The present disclosure relates generally to methods, systems, and apparatuses related to dynamically refining markers in a world model for an autonomous device. The disclosed techniques may be applied to, for example, industrial automation systems and other operating environments where autonomous devices are employed.

BACKGROUND

An autonomous system is an industrial system that possesses sufficient knowledge such that it can carry out tasks with only fairly high-level instruction. For example, a mobile robot that automatically searches for a machine in a factory, and then tends to that machine by opening it and taking parts out and putting parts back in, could be an autonomous device. The device would be autonomous if the robot were programmed only with fundamental knowledge of opening its target machine and how to pick and place parts and is not specifically programmed with an unaltered move-for-move sequence of operations for performing the task.

An autonomous system performs autonomous actions to act intelligently in situations for which the system was not explicitly programmed or trained. For such systems, a complex and robust model of the world in which the autonomous system acts can be crucial. Although some systems hide their world model behand stochastic and statistical data structures such as neural networks, others leverage knowledge from human programmers who develop sophisticated models to represent the environment of the world around the system.

The structure of the world model will necessarily contain objects representing the physical entities with which the autonomous device interacts. Also, the world model may contain semantic information that provides the knowledge with which the system knows how to interact with a particular object. For purposes of the present disclosure, it will be assumed that this kind of information is used to "mark" representations of physical objects in the world model. The set of knowledge information associated with an object is referred to herein as a "marker." In an actual system, such data may be distributed more widely or be assembled from algorithmic expressions. In general, the marker may be assumed to carry data for understanding an object. Additionally, the marker may be assumed to have an association either to a specific object or a general class of objects from which the association to a specific object may be derived.

The autonomous system's understanding of each object is highly dependent on the knowledge for the object in the world model. However, the data associated with an object is often dynamic and may be incomplete or incorrect at the time the autonomous system encounters the object in the environment. Thus, a major challenge in designing autonomous systems and their world models is ensuring that the data associated with objects is kept complete, correct, and up-to-date. Also, data may become relevant only when a criterion is reached such as when the device becomes in reach to interact with a marked object. In such a case, data may be retrieved as needed to continue operation with more detailed knowledge.

Programming an automation system to behave with autonomy is not common. A traditional automation program is hand-coded by human developers to make very specific programmatic responses to its input values. The relationships between input and output are often expressed as logical code such as using the IEEE1131 standard. In general, data structures that represent the machine's environment are not programmed in a general way; rather data is minimized to low-level Boolean and numeric values that only just cover the state that the algorithm must compute.

Academic systems that are used to research autonomous behavior can exhibit more complex adaptation patterns; however, these systems generally do not represent the world in a manner that can easily be explained. Use of deep learning and other machine learning techniques are applied that represent the machine's data and programmed behavior as a large set of numeric values. The particular meaning of the vast majority of these values is unknown to outside observers and the correctness of the program is difficult to estimate. Also, once a network or similar data structure is trained, the system does not update those values while the system is performing its tasks. Any transient knowledge must be represented as feedback loops within the network and it is not clear where and how such knowledge might be encoded.

Some academic systems may use ontological databases to encode knowledge for how the system should interpret objects and perform behavior. The databases are created from human knowledge and can act similarly to the world model with markers method described in this invention. The databases that have been shown so far are not updated when the machine gathers new information. Associations to specific physical objects are hand-coded as are the machine's overall functions and behavioral responses. Current ontological systems in academia also tend to focus on functions or behaviors of devices and not so much on knowledge representation. Actions may be encoded for a planning system with pre- and post-conditions for determining the validity for executing the actions at a given moment. What little knowledge about world state is known is encoded as Boolean state variables in a distributed manner. Accumulating or modifying knowledge about particular world objects is not part of the system.

SUMMARY

Embodiments of the present invention address and overcome one or more of the above shortcomings and drawbacks, by providing methods, systems, and apparatuses related to dynamically refining a world model as an autonomous device interacts with its operating environment. Briefly, the techniques described herein may be used to update information available from markers and replace more generic markers with specific markers as more data is gathered either from sensors or from an external knowledge base.

According to some embodiments, a system for performing autonomous operations in an operating environment comprising a plurality of objects includes a server computer. The server computer comprises a non-transitory computer readable medium storing detailed representations of the objects in the operating environment. Each detailed representation of an object comprises one or more markers providing knowledge information related to the object. The autonomous device comprises a non-transitory computer readable medium storing a world model that comprises sparse representations of the objects in the operating environment, a processor configured to use the world model to execute tasks requiring use of at least one of the objects, and a networking card for connecting to the server computer. When execution of a new task requires use of a particular object in the operating environment, the autonomous device updates the world model to include the detailed representation of the particular object.

According to other embodiments, a system for performing autonomous operations in an operating environment comprising a plurality of objects comprises an autonomous device. This autonomous device comprises long-term and short-term memory computer readable mediums, and a processor. The long-term non-transitory computer readable medium stores detailed representations of the objects in the operating environment. Each detailed representation of an object comprises one or more markers providing knowledge information related to the object. The short-term non-transitory computer readable medium stores a world model that comprises sparse representations of the objects in the operating environment. The processor uses the world model to execute tasks requiring use of at least one of the objects. When executing a new task requiring use of a particular object in the operating environment, the autonomous device updates the world model to include the detailed representation of the particular object.

According to another embodiment, a method for performing autonomous operations in an operating environment comprising a plurality of objects includes storing, in long-term memory at a server computer, detailed representations of the objects in the operating environment. This detailed representation of an object comprises one or more markers providing knowledge information related to the object. Additionally a world model comprising sparse representations of the objects in the operating environment is stored in short-term memory at an autonomous device. The method further includes the autonomous device receiving a new task requiring use of a particular object in the operating environment, and retrieving a detailed representation of the particular object from the server computer in response to receiving the new task. The autonomous device updates the world model to include the detailed representation of the particular object, and utilizes the updated world model to perform the new task.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following figures.

DETAILED DESCRIPTION

Systems, methods, and apparatuses are described herein that relate generally to the dynamically refining markers in a world model of an autonomous system. Most automation systems are not autonomous and those that are will use a fixed set of parameters usually derived from training Artificial Intelligence (AI) algorithms. With the techniques described herein, each autonomous machine has access to a dynamic world model. This world model is accessible from the standpoint of human understanding; but the world model is also mutable so that information pertinent to the task is provided based on with which objects the machine is interacting. Knowledge is not assigned completely to all objects from the start as is the case in conventional automation programming. An object that viewed from afar or is not completely known to the device can be considered in an incomplete or abstract state. The information can be brought forth in stages depending on how the machine needs to interact with the object at a given time and may be swapped with different information when the task changes. The information can be tagged to the objects within the world model and does not need to be distributed in a database-like fashion.

Figure 1:
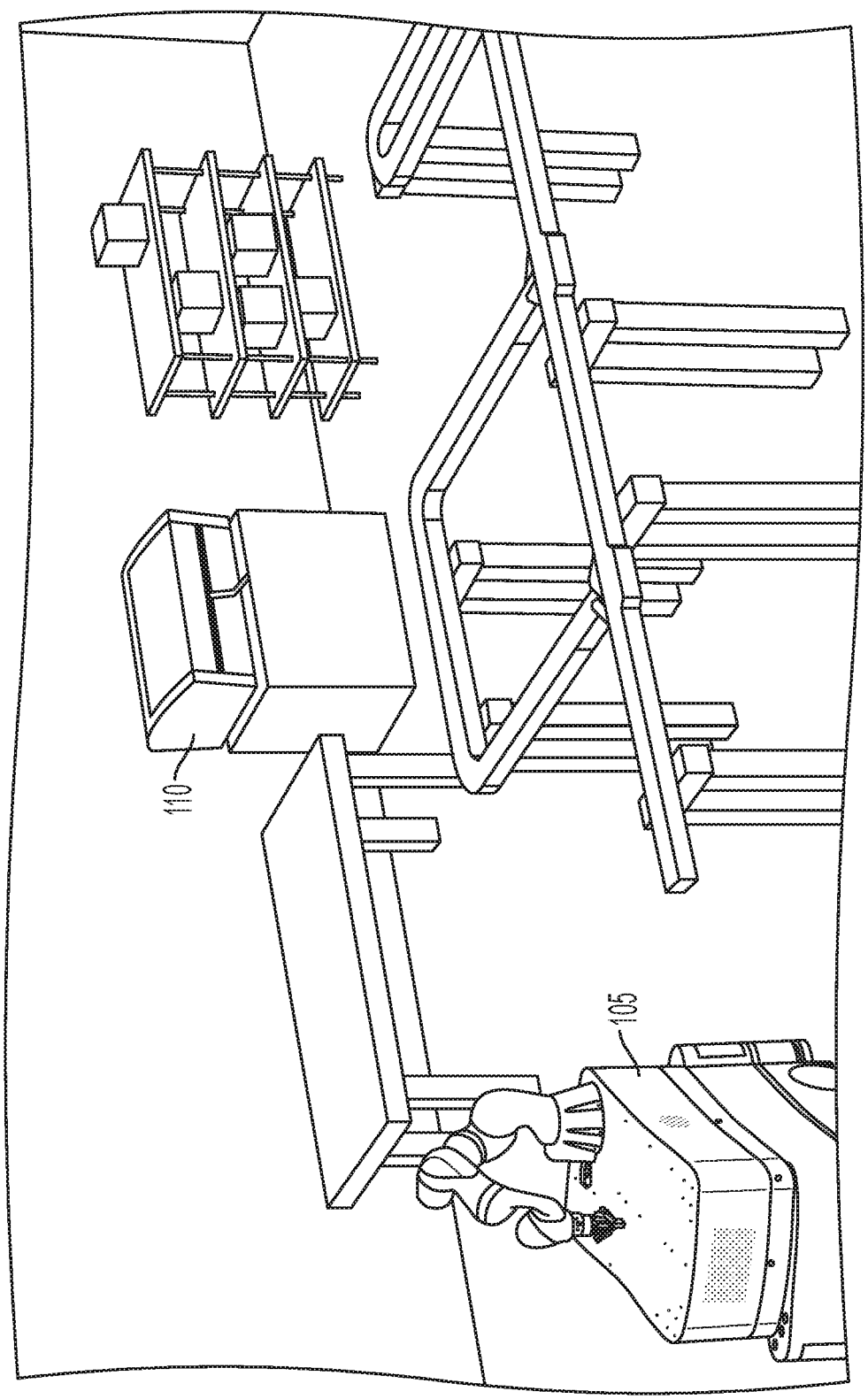
FIG. 1 provides an example scenario where a mobile robot interacts with a laser cutting device.

To illustrate the techniques for dynamically refining markers described herein, FIG. 1 provides an example scenario where a mobile robot 105 interacts with a laser cutting device 110 (or "laser cutter"). Although the mobile robot 105 is used in this example, it should be understood that the principles described herein may be applied to any device that can perform tasks with little or no support from users (i.e., any "autonomous device").

Assume that the desired task is for the mobile robot 105 to fetch a part from the laser cutting device 110 in the far corner. To perform this task, the mobile robot 105 must be given the task in the first place, move itself over to where the laser cutting device 110 is located, open the door of the laser cutting device 110, fetch the part within the laser cutting device 110, and finally close the door of laser cutting device 110. The task of fetching the part from the laser cutting device 110 may be provided either from direct command, such as a human directing the mobile robot 105 through a user interface, or via a directive from another system. For example, a manufacturing execution systems (MES) system may request that the part from the laser cutting device 110 be retrieved.

In the example of FIG. 1, the mobile robot 105 is part of an autonomous system. The term "autonomous system," as used herein refers to a system of one or more autonomous devices. The techniques described herein allow the autonomous system to dynamically manage and encode the knowledge for the various objects with which it must interact. This allows the autonomous system to gain and lose knowledge about particular objects as they are needed, rather than to try to maintain complete knowledge about all objects all the time. In the example shown in FIG. 1, the mobile robot 105 cannot reach the door of the laser cutting device 110 because it is located too far away. At this stage, the mobile robot 105 does not need detailed knowledge about the laser cutting device 110. Rather, the mobile robot 105 only needs basic knowledge such as its relative location in the room.

Figure 2:
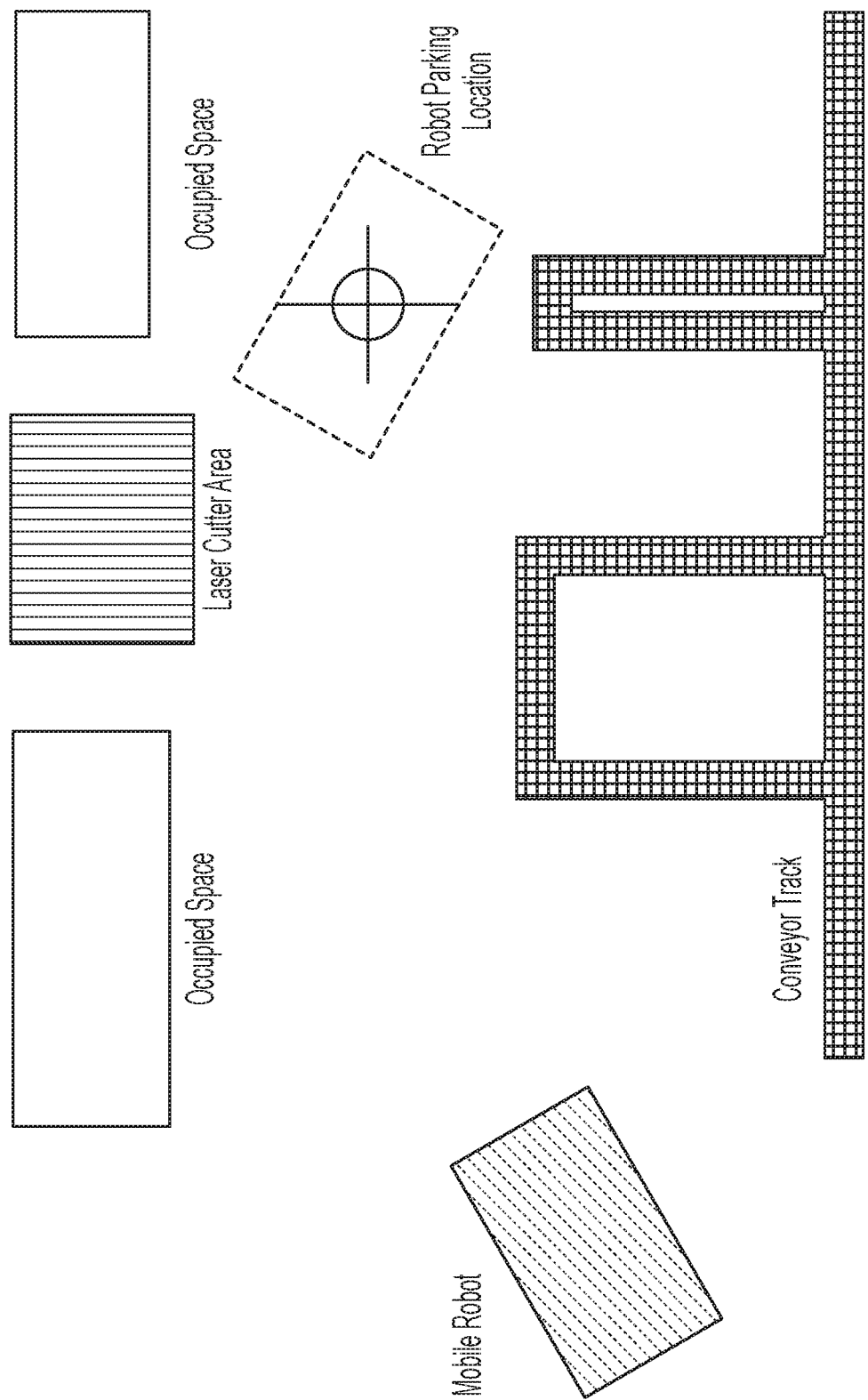
FIG. 2 shows how a non-descript form for laser cutting device can be augmented with labeling of a robot parking location.

FIG. 2 shows how a non-descript form for laser cutting device 110 can be augmented with labeling of a robot parking location. In FIG. 2, the overall map of the mobile robot and its surrounding objects is shown. Using this map, the mobile robot 105 can navigate to the laser cutting device 110, while avoiding objects. In this example, the laser cutting device 110 is represented as a boxy region (labelled "Laser Cutter Area" in FIG. 2) whose relative position is accurate with respect to the location of the mobile robot (labelled "Mobile Robot" in FIG. 2).

The mobile robot 105 stores a world model in its local memory that defines the objects in the operating environment. In some embodiments, this world model comprises coordinate values or other information defining three-dimensional objects in space. For example, the world model may include three-dimensional representations of the laser cutting device 110, as well as the conveyor track and objects in the occupied spaces shown in FIG. 1.

The level of detail included in the world model for each object can vary based on the level of interaction required for the task at hand. Thus, when the mobile robot 105 is not interacting with a particular object, the form and definition of that object may be abstract. For example, as shown in FIG. 2, the abstractness of the laser cutting device 110 is being represented as a two-dimensional box in a two-dimensional map. In some embodiments, the object may be a three-dimensional box, but may still be relatively formless. When the mobile robot 105 is assigned a task requiring use of the laser cutting device 110, the world model may be updated to include a detailed three-dimensional representation of the laser cutting device 110.

According to various embodiments of the present invention described herein, a world model allows for the system to read and interpret markers on the various objects in the model. For example, with reference to FIG. 2, the laser cutter's region may have the same type and description as the occupied space objects where the table and the shelves are located. The occupied space is labelled and shown in the figure but may be an unmarked three-dimensional space in the robot's world model. The laser cutter may also begin as an unmarked three-dimensional space, but once the system knows that it must work with the laser cutter, it may request that more knowledge about the laser cutter be provided. In this case, the system may add a marker to the occupied space object where the laser cutter sits so that it becomes an object that can be searched for by the robot. The robot searches for objects with a marker for the laser cutter, finds the marked region and then can proceed with its activity.

In some embodiments, the world model is augmented with contextual information concerning the robot's task and how it must interact with objects in the operating environment. For example, in FIG. 2, the laser cutter's object may be further enhanced with a marker showing the location where the mobile robot must park and orient itself in order to be able to reach the laser cutter and interact with it to perform the task. In the world model, markers may be associated with objects in the model. The type of marker may vary based on the characteristics of the object or location in space. For example, the laser cutting device 110 may be defined with a marker of a first type (e.g., "tool object"), while the parking location may be defined with a marker of a second type (e.g., "temporary parking area"). In some embodiments, it is possible for the system to record markers for other objects as well. For example, if the robot needed to pick something out of the shelves, then the region of the shelf may become marked with a label and parking position. Each object can be marked in its own way and can support many markers and different types of markers. The system can search for markers based on marker attributes such as marker type, marker content, attached objects, other markers associated with attached objects, geometric locations, and other possible methods.

When the mobile robot 105 is assigned the task using the laser cutting device 110, the mobile robot 105 updates its world model with the robot parking location marker. Then, the mobile robot 105 uses the world model to travel to the parking location. Along the way, it will become closer to the laser cutting device 110 and will be able to observe it in more detail. The perception of the laser cutting device 110 by the mobile robot 105 may be able to determine which kind of laser cutting device 110 is being used and where the device's location is positioned more precisely. The mobile robot 105 may update its world model to position the region of the laser cutter more precisely. This, in turn, will more precisely position the parking location marker because that marker is associated with the laser cutter object and can be moved in position relative to the perceived object.

The improved perception of the mobile robot 105 as it nears the laser cutting device 110 can be incorporated with more detailed information about the device to be provided. The detailed information of the laser cutter can contain more detailed information about the size and shape of the device, its kinematics, mass properties, as well as semantic markers pertaining to how to manipulate the device.

In some embodiments, the updates to the world model comprising information about the laser cutting device 110 may be provided by an outside source such as an online database. For example, in one embodiment, the mobile robot 105 includes an on-board networking card for connecting to a wireless network covering the operating environment. The updates to the world model can be delivered to the mobile robot 105 using any networking technique generally known in the art. For example, in some embodiments, a "push" networking architecture is used where a server uses an HTTP server push mechanism to deliver tasks to the mobile robot 105, along with relevant updates to the world model. In other embodiments, a "pull" networking architecture can be employed, wherein the mobile robot 105 sends specific requests to the server and the server replies with updates to the world model. For example, upon receiving a new task, the mobile robot 105 may determine that it needs an updated representation of the laser cutting device 110. At that point, the mobile robot 105 can issue a request for an updated world model to the server. In some embodiments, a location-based system may be used where the location of the mobile robot 105 in the operating environment is monitored (e.g., via cameras or on-board sensors), and the updates to the world model are delivered immediately before they are needed. For example, the updated representation of the laser cutting device 110 may only be delivered to the mobile robot 105 once it is in the robot parking location. As an alternative to the aforementioned network-based system, in some embodiments, the mobile robot 105 has an on-board database with detailed world model information. As needed, the mobile robot 105 internally sources the information from its own knowledge base. Even if the whole data is available locally, the system may still use the less detailed information generally and replace it with more detailed information when needed.

Figure 3:
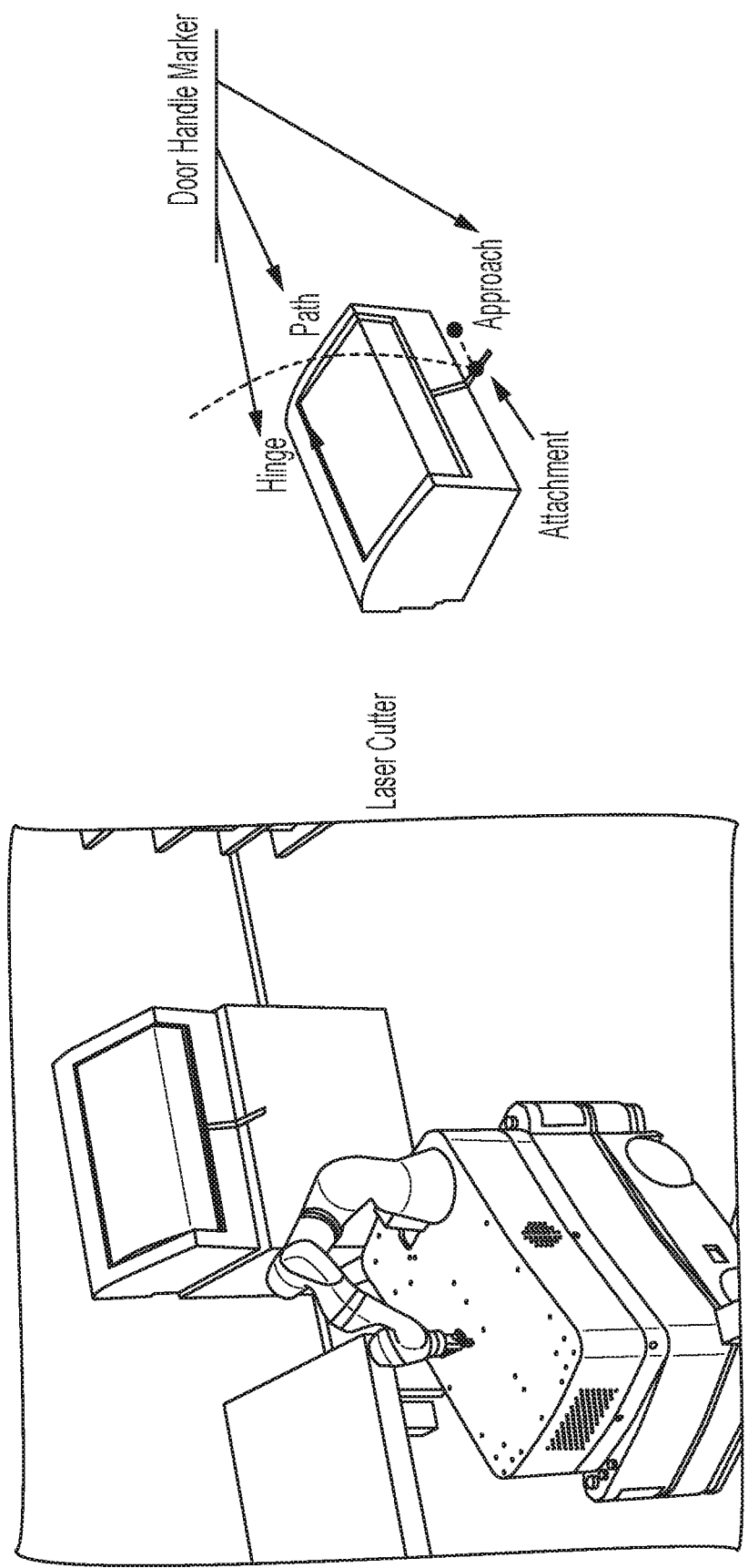
FIG. 3 illustrates an example of the types of information that can be provided to the mobile robot to supplement the world model.

FIG. 3 illustrates an example of the types of information that can be provided to the mobile robot to supplement the world model. This figure continues with the example of the mobile robot 105 interacting with the laser cutting device 110; however, it should be understood that the general concepts discussed below can be modified or extended depending on types of objects being used. As noted above, as needed, the mobile robot 105 replaces its less detailed knowledge about the laser cutter with the more detailed model. This replacement can occur by removing the original object and parameterizing a copy of the new object with positioning and other information from the original and placing the new copy into the model. The new detailed model may also be added to the model as an augmentation of the original object without deleting the original. The diagram on the right side of FIG. 3 shows an example of the physical and semantic knowledge that the mobile robot may need to open the lid. It shows the handle for the lid and marks the grasping position and path that the robot's motion must follow.

The autonomous device may use updates to its world model to perform activity or to otherwise inform behavior. The example shown in FIG. 3 shows details about how to approach and open the lid of the laser cutter device. Other information may include the location of work pieces inside and the manner to grasp the parts. Markers may become active when they are needed to perform the system's current behavior and made inactive when the behavior is not relevant or incomplete.

Figure 4A:
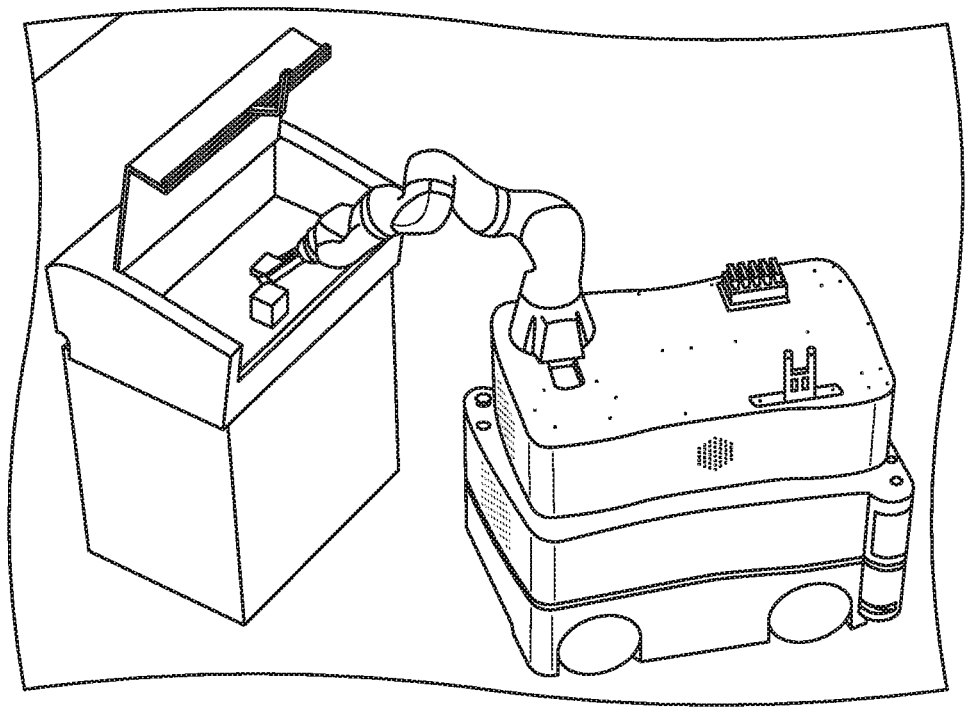
FIG. 4A shows a graphical depiction of how detailed object descriptions are used to perform autonomous behaviors.
Figure 4B:
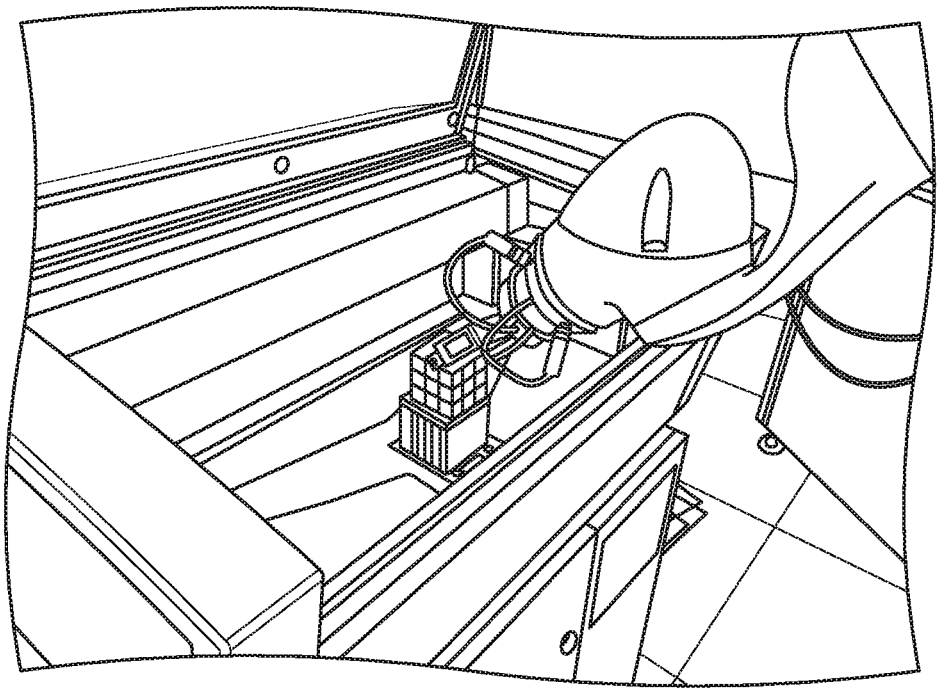
FIG. 4B shows a photograph of a physical mobile robot is shown performing the same task illustrated in FIG. 4A.

FIGS. 4A and 4B show examples of detailed object descriptions that may be used to perform autonomous behaviors. In this example, the mobile robot is shown grasping a part within the laser cutter. In FIG. 4A, a graphical depiction of the behavior is shown. In FIG. 4B, a photograph of a physical mobile robot is shown performing the same task.

Using a set of fixed knowledge for the system is the most likely alternative solution to the techniques described herein. The drawback to a fixed knowledge system is that the autonomous machine cannot easily be provided with new actions or activities without directly modifying its programming. Using the updated marker and object description method described herein, the autonomous device can be updated with new information based on object data. The system can act like an interpreter of things in its environment and can easily be extended to new things by providing new descriptions of those things.

Using an AI approach that learns new activities from experience is another alternative solution to the techniques described herein. This technique is generally not applicable in industrial settings due to the complexity of the large number of configurations of the environment that may occur during operations. Even in academia, the learning method is normally restricted to a training period that occurs before the device is deployed to the actual work area. Learning from simulation or experience is often slow and requires many hundreds or thousands of examples for a learning algorithm to generalize sufficiently to perform a task.

The use of an external knowledge source was discussed above. Some systems may consider only using an external knowledge source and not have or have significantly limited internal knowledge or programming. One may also employ remote control, where a user, such as a human, controls the device directly to accomplish its task. In this case, the activity of the autonomous device is recorded but knowledge about what objects the device is manipulating may not be managed.

Figure 5:
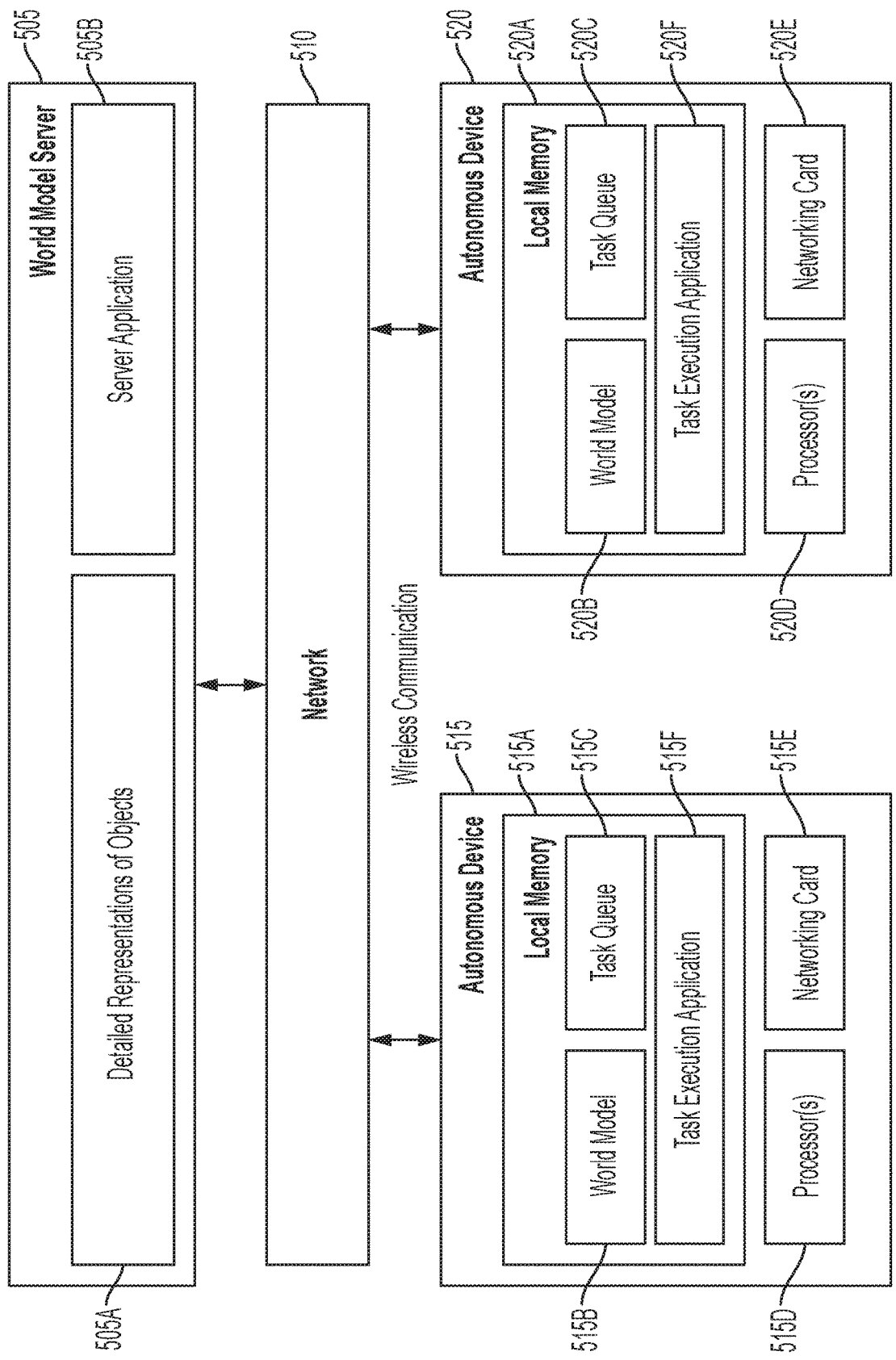
FIG. 5 shows an example architecture of a system for performing autonomous operations in an operating environment comprising a plurality of objects, according to some embodiments.

FIG. 5 shows an example architecture of a system for performing autonomous operations in an operating environment comprising a plurality of objects, according to some embodiments. The World Model Server 505 shown in FIG. 5 is a computer that comprises a non-transitory computer readable medium storing Detailed Representations of the Objects 505A that exists in the operating environment. These Detailed Representations of the Objects 505A each comprise markers providing knowledge information related to the object. In some embodiments, the computer readable medium storing Detailed Representations of the Objects 505A utilizes a database system that is generally known in the art. For example, in some embodiments, the data stored at each controller is stored in a No-SQL database which has a table equivalent structure. As is understood in the art, the term "No-SQL" is used to define a class of data stores that are non-relational in their design. In other embodiments, a traditional SQL database can be employed.

The World Model Server 505 also includes a Server Application 505B. The Server Application 505B is an executable software application that facilitates communications with the Autonomous Devices 515, 520. Various techniques may be applied to provide relevant data to the Autonomous Devices 515, 520. For example, Autonomous Device 515 may be assigned a new task (either via the Server Application 505B or from another application executing on another computer system not shown in FIG. 5) that requires use of a particular object. In some embodiments, upon receiving a new task, the Autonomous Device 515 issues a request to the Server Application 505B using an on-board Networking Card 515E to retrieve the detailed representation of the particular object (i.e., the markers associated with the particular object. In other embodiments, the Autonomous Device 515 may receive the detailed representation of the particular object using the Networking Card 515E via a push message from the Server Application 505B. For example, in some embodiments, the Server Application 505B may push tasks and their corresponding markers to the Autonomous Device 515 as they are created. In other embodiments, an application external to the World Model Server 505 notifies the Server Application 505B of the tasks scheduled to be executed by the Autonomous Device 515 and the Server Application 505B pushes the markers to the Autonomous Device 515 as needed. In still other embodiments, the Server Application 505B may monitor the Autonomous Device 515 to determine what tasks are scheduled to be executed and the markers can be pushed as needed. For example, as shown in FIG. 5, the Autonomous Device 515 may include a Task Queue 515C. The Server Application 505B may send an inquiry message to the Autonomous Device 515 periodically (e.g., every minute) and, in response, receive a listing of the upcoming tasks in the Task Queue 515C.

The World Model Server 505 connects to the Autonomous Devices 515, 520 over Network 510. Network 510 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between the Autonomous Devices 515, 520 and the World Model Server 505. The network 510 may be wired, wireless or a combination thereof. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the Network 510.

Each Autonomous Device 515, 520 includes a non-transitory computer readable medium, referred to as Local Memory 515A, 520A in FIG. 5. Each respective Local Memory 515A, 520A stores a world model that comprises (at least initially) sparse representations of the objects in the operating environment. The term "sparse," as used herein refers to representations of the objects that include less (and often much less) information than the Detailed Representations of the Objects 505A available at the World Model Server 505. For example, a sparse representation of the objects may include two dimensional representations of the object without any markers or using generic markers that only provide limited information (e.g., location).

Each Autonomous Device 515, 520 in this example also includes a Task Queue 515C, 520C. A Task Execution Application 515F, 520F removes and executes tasks from Task Queues 515C, 520C during operations. Each Autonomous Device 515, 520 includes one or more Processors 515D, 520D for using the World Models 515B, 520B to execute their respective tasks. Finally, as noted above, each Autonomous Device 515, 520 have a Networking Card 515E, 520E that facilitates communications with the World Model Server 505, and possibly other computing systems, via the Network 510. The type and functionality of each Networking Card 515E, 520E can vary according to the protocols supported by Network 510; however, in general, any type of networking card known in the art may be utilized. In some embodiments, as an alternative to having the Networking Card 515E, 520E located in the Autonomous Device 515, 520, networking is performing while the Autonomous Device 515, 520 is in a dock (not shown in FIG. 5). That is, the dock would be used to receive data from the World Model Server 505, and load that data into the Local Memory 515A, 520A of the Autonomous Device 515, 520.

Figure 6:
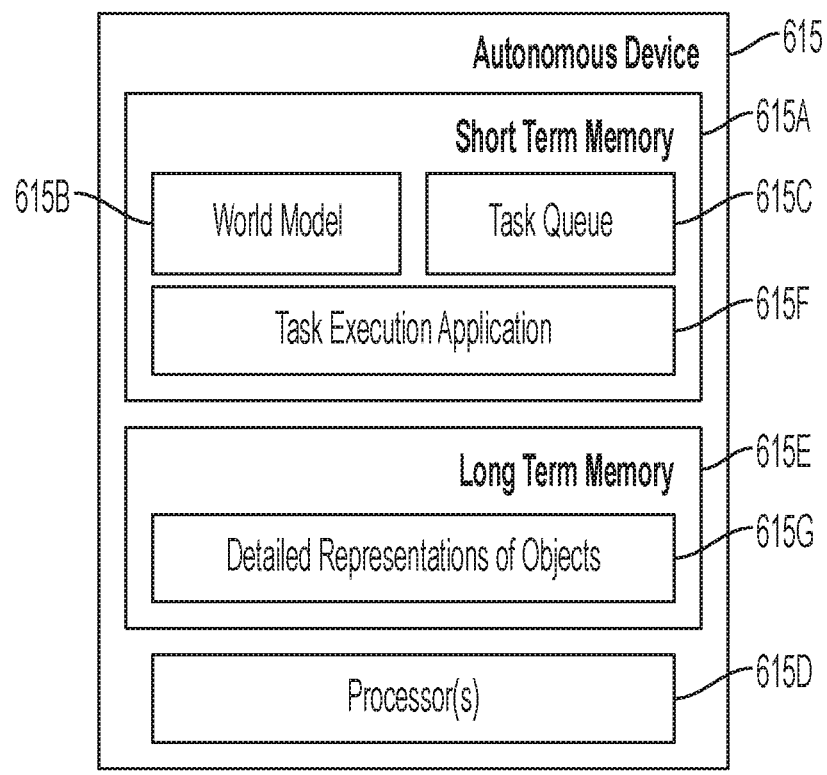
FIG. 6 shows an alternative example architecture of a system for performing autonomous operations in an operating environment comprising a plurality of objects, according to some embodiments.

FIG. 6 shows an alternative example architecture of a system for performing autonomous operations in an operating environment comprising a plurality of objects, according to some embodiments. As with the example shown in FIG. 5, the system includes an Autonomous Device 615 with a Short Term Memory 615A (i.e., a local memory) that holds a World Model 615B, a Task Queue 615C, and a Task Execution Application 615F. One or more Processors 615D execute tasks in the Task Queue 615C using the World Model 615B. In contrast to the system shown in FIG. 5, the Detailed Representations of the Objects 615G are stored in a Long Term Memory 615E (e.g., a database) in the Autonomous Device 615. When executing a new task requiring use of a particular object in the operating environment, the Autonomous Device 615 updates the World Model 615B to include a detailed representation of the particular object. That is, the Task Execution Application 615F (or another application executing on the Autonomous Device 615), retrieves the detailed representation of the particular object from the Long Term Memory 615E and updates the World Model 615B accordingly.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Unless stated otherwise as apparent from the following discussion, it will be appreciated that terms such as "applying," "generating," "identifying," "determining," "processing," "computing," "selecting," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) the element is expressly recited using the phrase "means for."

I claim:

1. A system for performing autonomous operations in an operating environment comprising a plurality of objects, the system comprising:
    a server computer comprising a first non-transitory computer readable medium storing detailed representations of the objects in the operating environment, wherein each detailed representation of an object comprises one or more markers providing knowledge information related to the object and pertaining to how to manipulate the object by an autonomous device;
    the autonomous device comprising:
        a second non-transitory computer readable medium storing a world model that comprises sparse representations of the objects in the operating environment, wherein the sparse representations of the objects include less information the detailed representations of the objects stored in the first non-transitory computer readable medium,
        a processor configured to use the world model to execute tasks requiring use of at least one of the objects, and
        a networking card for connecting to the server computer,
    wherein, when executing a new task requiring use of a particular object in the operating environment, the autonomous device updates the world model to include the detailed representation of the particular object including the one or more markers.

2. The system of claim 1 wherein, upon receiving the new task, the autonomous device issues a request to the server computer using the networking card to retrieve the detailed representation of the particular object.

3. The system of claim 1, wherein the autonomous device receives the detailed representation of the particular object for the particular object via the networking card via a push message from the server computer.

4. The system of claim 3, wherein the push message is transmitted upon detecting that the autonomous device is within a predetermined distance from the particular object associated with the new task.

5. The system of claim 1, wherein (a) the sparse representations of the objects in the operating environment each comprise two-dimensional representations of the objects and (b) the detailed representations of the objects each further comprise a three-dimensional representation of the objects.

6. The system of claim 1, wherein the autonomous device is a mobile robot.

7. The system of claim 6, wherein the detailed representation of the particular object comprises a first marker indicating a location wherein the autonomous device should be parked in order to interact with the particular object.

8. The system of claim 6, wherein the autonomous device uses the world model to navigate around objects in the operating environment.

9. The system of claim 1, wherein the detailed representation of the particular object comprises a first marker indicating a location on the particular object to be used by the autonomous device when performing the new task.

10. The system of claim 1, wherein the detailed representation of the particular object comprises a first marker indicating an object attached to the particular object.

11. A system for performing autonomous operations in an operating environment comprising a plurality of objects, the system comprising:
    an autonomous device comprising:
        a first non-transitory computer readable medium storing detailed representations of the objects in the operating environment, wherein each detailed representation of an object comprises one or more markers providing knowledge information related to the object and pertaining to how to manipulate the object by the autonomous device,
        a second non-transitory computer readable medium storing a world model that comprises sparse representations of the objects in the operating environment, wherein the sparse representations of the objects include less information than the detailed representations of the objects stored in the first non-transitory computer readable medium,
        a processor configured to use the world model to execute tasks requiring use of at least one of the objects, and
    wherein, when executing a new task requiring use of a particular object in the operating environment, the autonomous device updates the world model to include the detailed representation of the particular object including the one or more markers.

12. The system of claim 11, wherein (a) the sparse representations of the objects in the operating environment each comprise two-dimensional representations of the objects and (b) the detailed representations of the objects each further comprise a three-dimensional representation of the objects.

13. The system of claim 11, wherein the autonomous device is a mobile robot.

14. The system of claim 13, wherein the detailed representation of the particular object comprises a first marker indicating a location wherein the autonomous device should be parked in order to interact with the particular object.

15. The system of claim 13, wherein the autonomous device uses the world model to navigate around objects in the operating environment.

16. The system of claim 11, wherein the detailed representation of the particular object comprises a first marker indicating a location on the particular object to be used by the autonomous device when performing the new task.

17. The system of claim 11, wherein the detailed representation of the particular object comprises a first marker indicating an object attached to the particular object.

18. A method for performing autonomous operations in an operating environment comprising a plurality of objects, the method comprising:
    storing, in a first memory at a server computer, detailed representations of the objects in the operating environment, wherein the detailed representation of an object comprises one or more markers providing knowledge information related to the object and pertaining to how to manipulate the object by an autonomous device;
    storing, in a second memory at the autonomous device, a world model comprising sparse representations of the objects in the operating environment, wherein the sparse representations of the objects include less information than the detailed representations of the objects stored in the first memory;
    receiving, by the autonomous device, a new task requiring use of a particular object in the operating environment;

retrieving, by the autonomous device, a detailed representation of the particular object from the server computer in response to receiving the new task;
updating, by the autonomous device, the world model to include the detailed representation of the particular object including the one or more markers; and
utilizing, by the autonomous device, the updated world model to perform the new task.

19. The method of claim 18, further comprising:
deleting, by the autonomous device, the detailed representation of the particular object from the second memory after completion of the new task.

* * * * *